(12) United States Patent
Aoike et al.

(10) Patent No.: US 7,565,812 B2
(45) Date of Patent: Jul. 28, 2009

(54) METHOD FOR IMPROVING RESIDUAL STRESS IN PIPE AND APPARATUS

(75) Inventors: Satoru Aoike, Tokai (JP); Masakazu Hisatsune, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 498 days.

(21) Appl. No.: 11/442,282

(22) Filed: May 30, 2006

(65) Prior Publication Data

US 2006/0277929 A1 Dec. 14, 2006

(30) Foreign Application Priority Data

May 31, 2005 (JP) ............................. 2005-158290

(51) Int. Cl.
*F25C 1/00* (2006.01)
(52) U.S. Cl. ............................................. 62/66; 62/293
(58) Field of Classification Search .................... 62/293, 62/66, 340
See application file for complete search history.

(56) References Cited

U.S. PATENT DOCUMENTS 3,926,006 A * 12/1975 Brooks et al. .................. 62/66
4,220,012 A * 9/1980 Brister ........................ 62/130
4,267,699 A * 5/1981 Bahrenburg ................... 62/66
5,680,770 A * 10/1997 Hall et al. .................... 62/293

FOREIGN PATENT DOCUMENTS

| JP | 57-075296 | 5/1982 |
| JP | 57-175094 | 10/1982 |
| JP | 57-177924 | 11/1982 |
| JP | 2000-052247 | 2/2000 |
| JP | 2001-150178 | 6/2001 |
| JP | 2005095948 | 4/2005 |

OTHER PUBLICATIONS

"Development of Stress Relief Method for Weld Joint of Pipe using Ice Plug" by M. Nayama, et al. pp. 132-136. 1994.

* cited by examiner

*Primary Examiner*—William E Tapolcai
(74) *Attorney, Agent, or Firm*—Brundidge & Stanger, P.C.

(57) ABSTRACT

An method for converting tensile residual stress on an inner surface of a welded part of a pipe to compressive residual stress with use of ice plugs formed by cooling the pipe from the outer surface, comprises the steps of: placing refrigerant containers for forming the ice plugs in the upstream and downstream of a butt-welded part; cooling the outer surface of the pipe to form the ice plugs; and then cooling the outer surface of the pipe with use of at least one refrigerant container for expanding the pipe arranged between the refrigerant containers for forming the ice plugs.

When the method is applied to a pipe with a large inside diameter, the method comprises forming the ice plugs at a curved pipe, an elbow or a branch pipe in the upstream and downstream of the butt-welded part.

4 Claims, 3 Drawing Sheets

METHOD FOR IMPROVING RESIDUAL STRESS IN PIPE AND APPARATUS

BACKGROUND OF THE INVENTION (1) Field of the Invention

The present invention relates to a method for improving residual stress at a welded part of a pipe made of austenitic stainless steel or the like, in which stress corrosion cracking can occur.

(2) Description of Related Art

As an example for reducing residual stress in an inner surface of a pipe, JP-A-2001-150178 discloses that an outer surface of an annular welded part is rapidly heated to decrease tensile residual stress on an inner surface. According to the document, a temperature difference between the inner and outer surfaces of the pipe is introduced by rapid heating of the pipe, so that the residual stress in the inner surface of the pipe, which is a low-temperature side, is improved by using the difference of the thermally expansion between the inner and outer surfaces.

In addition, there is a high-frequency induction heating method for decreasing tensile residual stress in an inner surface of a pipe, in which an outer surface side is heated by induction heating with use of a high-frequency induction heating coil while the inner surface of the pipe is being cooled with water, so that a temperature difference between the inner and outer surfaces are imparted.

As an example for improving tensile residual stress on an inner surface of a small diameter pipe, JP-A-2000-052247 discloses that a high-speed stream of water containing cavitation bubbles is spouted from a nozzle to the inner surface of the small-diameter pipe filled with water, and the cavitation bubbles are broken in the vicinity of the inner surface of the small-diameter pipe so that the condition of tensile residual stress is improved.

As an example for decreasing a tensile residual stress on an inner surface of a welded part of a pipe with use of an ice plug formed by cooling of the pipe from the outer surface, JP-B2-1559804 discloses that each one portion of both sides of the welded part or only the welded part is cooled from the outer surface to form the ice plug, and the welded part is isolated and consequently the inner pressure is increased, so that the vicinity of the pipe of the welded part is expanded. JP-B2-1544585 discloses an example for expanding the pipe while heating the outer surface of the pipe at the welded part to prevent a formation of the ice plug at the welded part. JP-B2-1428283 discloses an example for controlling an amount of expansion of the pipe by applying an electric current to the pipe containing a part inside of which the ice plug is formed, and accelerating a melting of the ice plug by heating. Furthermore, Michisuke Nayama, "Development of Stress Relief Method for Weld Joint of Pipe using Ice Plug", Quarterly Journal of the Japan Welding Society, Vol. 12 No. 1, pages 132 to 136, 1994, discloses a test result of decreasing residual stress on an inner surface of a pipe with use of a ice plug formed by cooling the pipe from the outer surface.

BRIEF SUMMARY OF THE INVENTION

Austenitic stainless steel and a nickel-based alloy may be subjected to stress corrosion cracking when exposed to a corrosive environment in high-temperature pure water for a long time, while tensile residual stress is loaded. A power plant employs a high-temperature pipe made of austenitic stainless steel in a pipe system constituting itself, and a pipe at a high temperature is desired to reduce its tensile residual stress working on the inner surface of the pipe in the vicinity of a welded part or convert it into compressive one. Particularly, an execution method which can be simply applied to an already constructed pipe system employed in a currently-operated power plant is strongly expected.

When executing a work on the basis of the well-known example of decreasing tensile residual stress on an inner surface at a welded part of a pipe with use of an ice plug formed by cooling the pipe from an outer surface, the ice plug has a poor pressure resistance in an early stage of its formation, because the ice plug repeats the following processes of (a) formation of the ice plug
(b) increase in inner pressure according to a growth of the ice plug
(c) partial destruction of the ice plug
(d) reduction in inner pressure between the ice plugs
(e) formation of the ice plug, so that when the ice plug has grown to acquire adequate pressure resistance, water has been already frozen in a wide range. In order to freeze water for expanding the pipe, the water has to be cooled through the ice plug already formed in a wide area, which decreases heat transferability and requires a long period of time for completing the execution, and consequently requires refrigerant having high coolability such as liquid nitrogen. In addition, because water is cooled through the ice plug formed in the large area, the ice plug continues to grow by a redundant cooling capacity of the ice plug formed in the large area, even if having stopped cooling just after having imparted objective strain to the outer surface of the pipe. Thus, the above method is required to control the strain to be given on the outer surface of the pipe by using a technique such as heating of the surface.

The present invention is made in view of the above described problems, and is directed to providing a simple execution method for converting tensile residual stress working on an inner surface in the vicinity of a welded part of a pipe to compressive residual stress in a short period of time, and to providing an apparatus therefore. In order to solve such problems, a method for improving residual stress in a welded part of a pipe is provided, in which a pressure inside the pipe is increased with use of ice plugs formed by cooling the pipe from the outer surface, the method comprising: placing refrigerant containers for forming the ice plugs in the upstream and downstream of the welded part of the pipe, and cooling the outer surface of the pipe to form the ice plugs inside the pipe; and then cooling the pipe with use of at least one refrigerant container for expanding the pipe, which is arranged between the refrigerant containers for forming the ice plugs. Thereby, the method improves the efficiency of cooling water between the ice plugs, and shortens an execution period of time. In addition, the method can shorten the execution period of time even by using as a refrigerant ethanol added with dry ice, because requirement for coolability for the refrigerant is alleviated due to improved cooling efficiency.

Specifically, refrigerant containers for forming ice plugs is placed in the upstream and downstream of a butt-welded part of a pipe which is filled with water, at spacing such that a refrigerant container for expanding the pipe can be placed between them. Dry ice and ethanol are charged into the refrigerant containers for the ice plugs, and are left for a sufficient period of time to form the ice plugs in the pipe. At this time, the inner pressure is increased by the formation of the ice plugs, but an amount of the increased pressure is small because a distance between the ice plugs is sufficiently long. The expansion of the pipe is started after the refrigerant container for expanding the pipe has been placed between the refrigerant containers for forming the ice plugs and apart from the welded part, and the dry ice and the ethanol have been charged therein as a refrigerant. An amount to be expanded of the pipe is controlled, by measuring strain generated in a circumferential direction with a strain gauge which has been previously arranged at an outer surface of an edge preparation part in the vicinity of the welded part of the pipe, and stopping cooling when the outer surface started to be plastically deformed. Cooling is stopped by draining the ethanol from a drainage hole of the bottom of the refrigerant container for expanding the pipe, and removing the dry ice from the inside of the container. The present execution method has high cooling efficiency, because cooling is started from such a condition in which ice is not yet formed in a section to be cooled when expanding the pipe. A large area can be set to be cooled, and accordingly the above operations can be finished in a short period of time. In addition, the ice plug finishes its growth due to redundant cooling capacity in a short period of time, because ice is thinly formed by cooling during expanding the pipe. For this reason, the method does not need heat treatment after having finished cooling. Thereby, the provided execution method easily converts tensile residual stress working on the inner surface in the vicinity of the welded part of the pipe to compressive residual stress, in a short period of time.

In order to solve the above described problems, the method according to the present invention also comprises: placing refrigerant containers for forming ice plugs, at a curved pipe, an elbow or a branch pipe in the upstream and downstream of a butt-welded part of a pipe, and cooling an outer surface of a pipe to form the ice plugs inside the pipe, for expanding the vicinity of the welded part in the pipe. Thereby, the present execution method makes a pipe wall support a driving force on the ice plug in a pipe axis direction, which is generated when expanding the pipe due to a pressure difference between internal pressures on an upstream face and a downstream face of the ice plug, as a load vertical to the pipe wall in the part at which the ice plug are formed. Thereby, reduction of the internal pressure due to the movement of the ice plug in an axial direction of the pipe is prevented, and accordingly the method can be applied to a pipe with a large inner diameter.

The execution method according to the present invention has high cooling efficiency, because cooling is started from such a condition in which ice is not yet formed in a section to be cooled when expanding the pipe. A large area can be set to be cooled, accordingly the operations can be finished in a short period of time, and a refrigerant with low coolability can be employed.

The method according to the present invention can provide an execution method and a system which do not require heat treatment after having finished cooling, because ice is thinly formed by cooling during expanding the pipe, so that an ice plug finishes its growth due to redundant cooling capacity in a short period of time.

In addition, the execution method according to the present invention makes a pipe wall support a driving force on the ice plug in a pipe axis direction, which is generated when expanding the pipe by a pressure difference between internal pressures on the upstream face and the downstream face of the ice plug, as a load vertical to the pipe wall in the part at which the ice plug are formed. Thereby, reduction of the internal pressure by the movement of the ice plug in an axial direction of the pipe when increasing the inner pressure is prevented, and accordingly the method can be applied to a welded part of a pipe with a large inner diameter.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 2A shows the state of strain and stress on an inner surface of the pipe, and FIG. 2B shows the state of strain and stress on an outer surface of the pipe.

DETAILED DESCRIPTION OF THE INVENTION

Embodiments according to the present invention will be described below with reference to the drawings.

EMBODIMENT 1

An execution method according to the present invention will be described with reference to FIG. 1, which converts tensile residual stress on an inner surface of a welded part of a pipe to compressive residual stress, with use of ice plugs formed by cooling the pipe from an outer surface.

Figure 1:
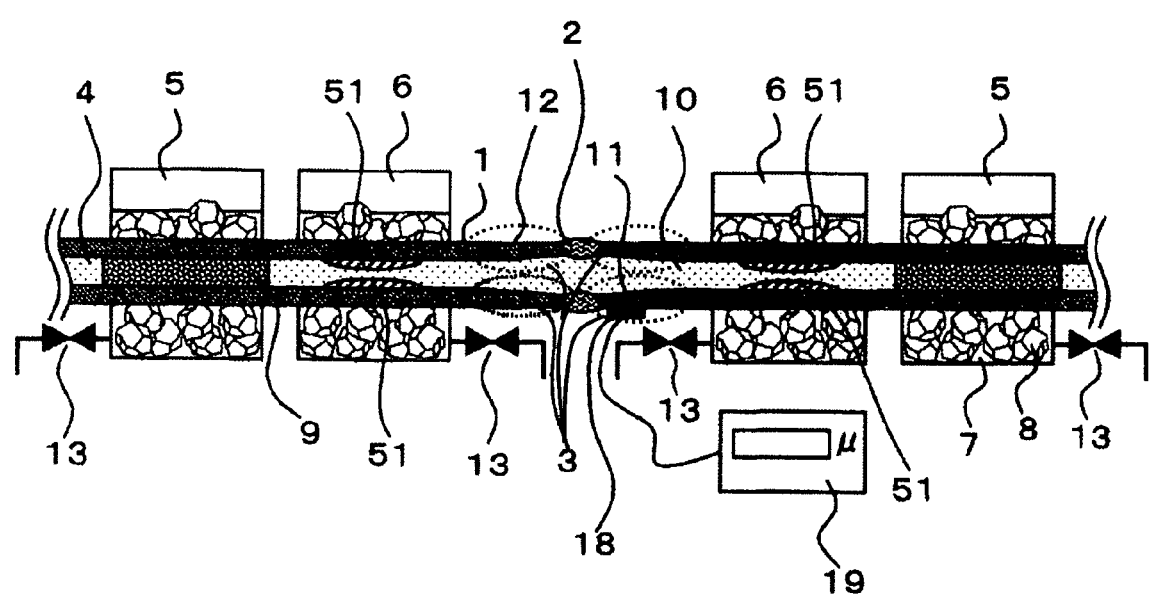
FIG. 1 is a view explaining an execution method for giving compressive residual stress on an inner surface in the vicinity of a butt-welded part of a pipe by the steps of: placing refrigerant containers for forming ice plugs in the upstream and downstream of a butt-welded part of a pipe; cooling an outer surface of the pipe to form the ice plugs; and then cooling an outer surface of the pipe with use of a refrigerant container for expanding the pipe, which is arranged between the refrigerant containers for forming the ice plugs.

FIG. 1 shows an embodiment of an execution method which is applied to the vicinity of a butt-welded part of a pipe, and includes the steps of: placing refrigerant containers for forming ice plugs in the upstream and downstream of the butt-welded part of the pipe; cooling an outer surface of the pipe to form the ice plugs; and then cooling an outer surface of the pipe with use of at least one refrigerant container for expanding the pipe, which is arranged between the refrigerant containers for forming the ice plugs.

In the embodiment shown in FIG. 1, there is an edge preparation part 3 with a partially-thin pipe thickness in the vicinity of the butt-welded part 2 of the pipe 1. The inside of the pipe 1 is filled with water 4. Refrigerant containers 5 for forming ice plugs are placed in the upstream and downstream of the butt-welded part 2 of the pipe 1, and at least one refrigerant container 6 for expanding the pipe is placed between the refrigerant containers 5. A strain gauge 18 is placed on an outer surface 12 of the edge preparation part 3 with the partially-thin pipe thickness in the vicinity of the butt-welded part 2, and a measuring instrument 19 is connected to the strain gauge 18, so as to correct the zero point and measure circumferential strain generated when the pipe is expanded.

At first, the vicinity of the pipe of the welded part is expanded by charging ethanol 7 and dry ice 8 into the refrigerant container 5 for forming the ice plugs, and by forming ice plugs 9 in the pipe 1. The ice plugs 9 are formed so as not to be moved even when the pressure has been changed during pipe expansion treatment which will be described later, and so as to be strongly fixed to the pipe 1. A water-tight space 10 is formed in the pipe 1 including a butt-welded part 2 between thus formed ice plugs 9.

The inner pressure in the water-tight space 10 is increased by placing at least one refrigerant container 6 for expanding the pipe between the refrigerant containers 5 for forming the ice plugs, charging ethanol 7 and dry ice 8 to rapidly cool and solidify water 4 in the water-tight space 10 and form ice 51, and thereby expanding the volume in the water-tight space 10. Then, as the inner pressure increases, an edge preparation part 3 with a thin pipe thickness is selectively expanded. When the circumferential strain of the outer surface 12 of the edge preparation part 3 measured by the strain gauge 18 and the measuring instrument 19 becomes not less than 0.4%, it is judged that plastic deformation has begun on the outer surface 12, and then cooling is stopped to finish the expansion of the pipe. The cooling is stopped by removing dry ice 8 and ethanol 7 from the refrigerant container 6 for expanding the pipe and the refrigerant containers 5 for forming the ice plugs. In the above step, the ethanol 7 can be removed by opening valves 13 for drainage placed in the refrigerant containers 5 for forming the ice plugs and the refrigerant container 6 for expanding the pipe.

Next, the reason why the expansion of a pipe 1 gives a circumferential compressive residual stress on an inner surface 11 will be described with reference to FIGS. 2A and 2B.

Figure 2A:
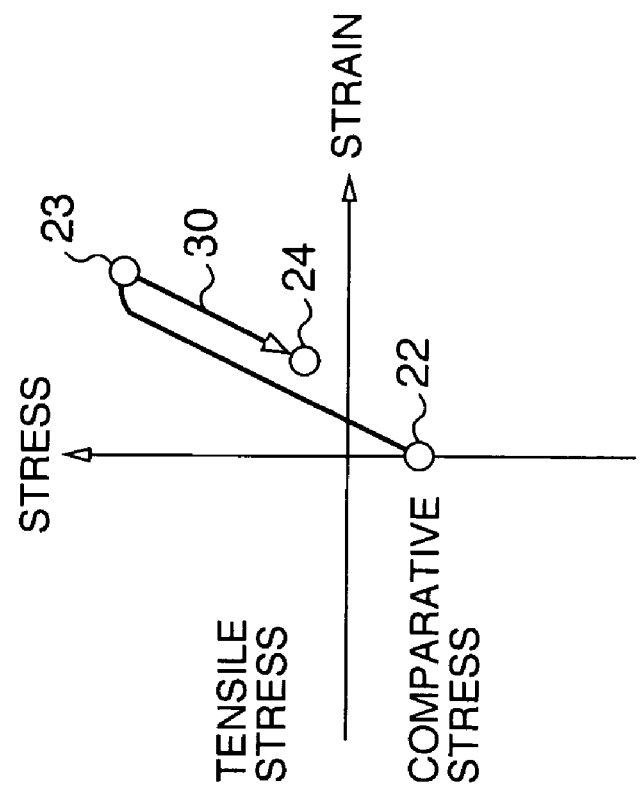
FIGS. 2A and 2B are views explaining a principle of giving circumferential compressive residual stress on an inner surface of a pipe by expanding the pipe.
Figure 2B:
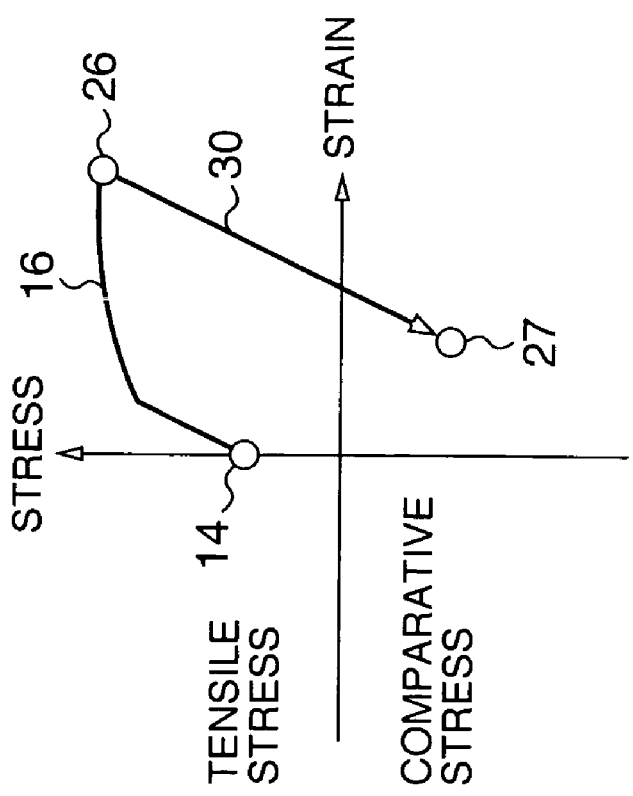

FIG. 2A shows the state of strain and stress on an inner surface of a pipe, and shows that the state of the strain and stress migrates from a state 14 which indicates a state before the execution, through a state 26 at which an expansion of the pipe due to the execution has been finished, to a state 27 which indicates a state after the execution has been finished. FIG. 2B shows the state of strain and stress in an outer surface of the pipe, and shows that the state of the strain and the stress migrates from a state 22 which indicates a state before the execution, through a state 23 at which the expansion of the pipe due to the execution has been finished, to a state 24 which indicates a state after the execution has been finished.

Generally, in states 14 and 22 before the execution in the vicinity of butt-welded parts 2 of a pipe 1, residual stress is generated due to welding. The residual stress is tensile on the inner surface of the pipe and compressive on the outer surface. Strain 15 generated by the expansion of the pipe 1 is greater in a state 26 of the inner surface of the pipe than in the state 23 of the outer surface, due to a difference of diameters between the inner and outer surfaces. Because the tensile stress is applied, during expansion of the pipe, to the starting state 14 at which the tensile residual stress works on the inner surface of the pipe, plastic deformation 16 occurs on the inner surface earlier than on the outer surface when the pipe is expanded. For this reason, plastic deformation is given to the inner surface more than to the outer surface, by the expansion of the pipe 1.

When internal pressure which has been once increased by the expansion of a pipe decreases due to the melting 30 of the ice plug 9, strain corresponding to elastic deformation starts returning on the inner and the outer surfaces of the pipe. At this time, the strain 17 corresponding to the elastic deformation on the outer surface remains as tensile residual stress without completely returning because much strain has been applied to the inner surface of the pipe, and works as a driving force for applying the compressive residual stress to the inner surface of the pipe.

Cooling of the outer surface by using a refrigerant container 6 for the expansion of the pipe is finished when not less than twice amount of strain for causing plastic deformation, which is estimated from stress-strain characteristics of a pipe material, specifically the strain of not less than 0.4%, has been applied to the outer surface of the pipe, because the outer surface of the pipe is generally in a state 22 of compressive residual stress before the execution.

EMBODIMENT 2

Another embodiment of an execution method according to the present invention for converting tensile residual stress working on an inner surface of a welded part of a pipe to compressive residual stress with use of an ice plug formed by cooling the pipe from the outer surface will be described with reference to FIG. 3.

Figure 3:
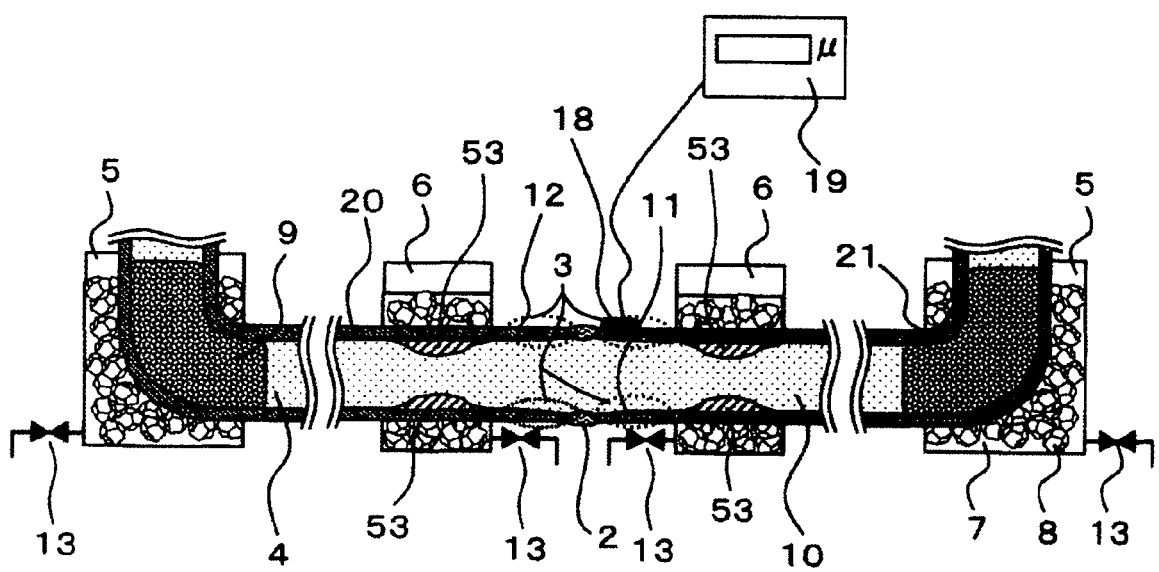
FIG. 3 is a view explaining an execution method of giving compressive residual stress on an inner surface in the vicinity of a butt-welded part of a pipe with a large inside diameter.

FIG. 3 shows an embodiment of an execution method which is applied to the vicinity of a butt-welded part of a pipe with a large inner diameter, and comprises the steps of: placing refrigerant containers 5 for forming ice plugs in the upstream and downstream of the butt-welded part of the pipe; cooling an outer surface of the pipe to form the ice plugs; and then cooling an outer surface of the pipe with use of at least one refrigerant container 6 for expanding the pipe, which is arranged between the refrigerant containers for forming the ice plugs.

In the embodiment in FIG. 3, there is an edge preparation part 3 with a partially-thin thickness in the vicinity of the butt-welded part 2 of the pipe 20 with a large inside diameter. The pipe 20 with the large inside diameter is filled with water 4. At least one curved pipe or elbow 21 is selected from each of the upstream and downstream of the butt-welded part 2 of the pipe 20 with the large inside diameter, and refrigerant containers 5 for forming ice plugs are placed there and at least one refrigerant container 6 for expanding the pipe is placed between the refrigerant containers 5 for forming the ice plugs. A strain gauge 18 is placed on the outer surface 12 of the edge preparation part 3 with the partially-thin thickness in the vicinity of the butt-welded part 2. The zero point is corrected, and a measuring instrument 19 is connected to the strain gauge 18, so as to measure circumferential strain generated when the pipe is expanded.

At first, an ice plug 9 is formed in an elbow 21, by charging ethanol 7 and dry ice 8 into refrigerant containers 5 for forming ice plugs, which have been placed at a curved pipe or an elbow 21. The ice plugs 9 are formed so as not to be move even when the pressure are changed during pipe expansion treatment which will be described later. A water-tight space 10 is formed in the pipe 20 with a large inside diameter including a butt-welded part 2 between thus formed ice plugs 9. Subsequently, the inner pressure in the water-tight space 10 is increased by charging ethanol 7 and dry ice 8 into the refrigerant container 6 for expanding the pipe to solidify water 4 in the water-tight space 10 to form ice 53 and consequently expanding the volume thereof. At this time, driving force in a pipe axis direction, which has been generated by a difference between internal pressures on both surfaces of the ice plug 9, is supported by a pipe wall of the curved pipe or the elbow 21 having the ice plug formed thereon, which is perpendicular to the driving force. Cooling is stopped to finish the expansion of the pipe after it has been confirmed that plastic deformation has begun on the outer surface 12, based on the circumferential strain of the outer surface 12 of the edge preparation part 3 measured by a strain gauge 18 and a measuring instrument 19. The cooling is stopped as in the case of above described Embodiment 1, by removing dry ice 8 and ethanol 7 in the refrigerant container 6 for expanding the pipe and the refrigerant containers 5 for forming the ice plugs. In the above step, the ethanol 7 can be removed by opening valves 13 for drainage placed in the refrigerant containers 5 for forming the ice plugs and the refrigerant container 6 for expanding the pipe.

Cooling of the outer surface with use of the refrigerant container 6 for the expansion of the pipe is finished, as in the case of Embodiment 1, when not less than twice amount of strain for causing plastic deformation, which is estimated from stress strain characteristics of a pipe material, specifically the strain of not less than 0.4%, has been applied to the outer surface of the pipe.

The present invention can be applied to a pipe of various materials, and has the effect of inhibiting a butt-welded part, particularly of a pipe made of austenitic stainless steel, from being subject to stress corrosion cracking.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for improving residual stress in a welded part of a pipe by increasing a pressure inside the pipe and expanding the pipe at a welded part, with use of ice plugs formed by cooling the pipe from an outer surface, comprising:
    placing refrigerant containers for forming the ice plugs upstream and downstream of the welded part of the pipe, and for cooling the outer surface of the pipe to form the ice plugs inside the pipe; and
    then cooling the pipe with use of at least one refrigerant container for expanding the pipe arranged between the refrigerant containers for forming the ice plugs, to increase cooling efficiency of water between the ice plugs.

2. The method according to claim 1, wherein the refrigerant containers for forming the ice plugs are placed at a curved pipe, an elbow or a branch pipe upstream and downstream of a butt-welded part of the pipe, and the outer surface of the pipe is cooled to form the ice plugs,
    wherein a pipe wall supports a driving force on the ice plug in a pipe axis direction as a load vertical to a part of the pipe wall where the ice plug is formed, the driving force being generated during expanding the pipe by a pressure difference between internal pressures on an upstream face and a downstream face of the ice plug, and
    wherein capability of expanding the pipe is improved when expanding a vicinity of the welded part in the pipe.

3. An apparatus for improving residual stress at a welded part of a pipe by increasing a pressure in the pipe with use of ice plugs formed by cooling the pipe from the outer surface, comprising:
    first and second refrigerant containers for forming the ice plugs placed upstream and downstream of the welded part of the pipe; and
    at least one container for expanding the pipe, placed between the first and second refrigerant containers, the container for expanding the pipe being used to cool the pipe to expand the welded part of the pipe after forming the ice plugs by cooling the outer surface of the pipe by the first and second refrigerant containers for forming the ice plugs.

4. The apparatus according to claim 3, wherein the first and second refrigerant containers for forming the ice plugs are placed at a curved pipe, an elbow or a branch pipe upstream and downstream of a butt-welded part of the pipe.

\* \* \* \* \*